United States Patent
Fukuda et al.

(10) Patent No.: US 9,061,944 B2
(45) Date of Patent: Jun. 23, 2015

(54) DIELECTRIC CERAMIC, LAMINATED CERAMIC CAPACITOR, METHOD FOR PRODUCING THE DIELECTRIC CERAMIC, AND METHOD FOR MANUFACTURING THE MULTILAYER CERAMIC CAPACITOR

(71) Applicant: MURATA MANUFACTURING CO., LTD., Nagaokakyo, Kyoto-fu (JP)

(72) Inventors: Megumi Fukuda, Nagaokakyo (JP); Takayuki Yao, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 142 days.

(21) Appl. No.: 13/753,845

(22) Filed: Jan. 30, 2013

(65) Prior Publication Data

US 2013/0141838 A1    Jun. 6, 2013

Related U.S. Application Data

(63) Continuation of application No. PCT/JP2011/068942, filed on Aug. 23, 2011.

(30) Foreign Application Priority Data

Sep. 17, 2010    (JP) ................................ 2010-209281

(51) Int. Cl.
*H01G 4/06* (2006.01)
*C04B 35/00* (2006.01)
(Continued)

(52) U.S. Cl.
CPC ............... *C04B 35/46* (2013.01); *Y10T 29/435* (2015.01); *C04B 35/4682* (2013.01); *C04B 2235/3206* (2013.01); *C04B 2235/3215* (2013.01); *C04B 2235/3224* (2013.01); *C04B 2235/3232* (2013.01); *C04B 2235/3262* (2013.01); *H01B 3/12* (2013.01); *H01G 4/1227* (2013.01); *H01G 4/30* (2013.01); *H01G 4/1209* (2013.01);
(Continued)

(58) Field of Classification Search
USPC .................... 361/321.1–321.5; 501/135–137; 29/25.42
See application file for complete search history.

(56) References Cited

U.S. PATENT DOCUMENTS

| 8,097,551 B2 | 1/2012 | Kamigaki et al. |
| 2004/0201137 A1* | 10/2004 | Zhan et al. ..................... 264/434 |
| 2010/0195265 A1* | 8/2010 | Nakamura et al. ......... 361/321.4 |

FOREIGN PATENT DOCUMENTS

| JP | 2007145649 A | 6/2007 |
| JP | 2008081350 A | 4/2008 |

(Continued)

OTHER PUBLICATIONS

Written Opinion, issued in PCT/2011/068942, mailed Nov. 22, 2011.

*Primary Examiner* — Eric Thomas
(74) *Attorney, Agent, or Firm* — Arent Fox LLP

(57) ABSTRACT

Provided is a laminated ceramic capacitor which produces excellent lifetime characteristics in a high-temperature loading test even when dielectric layers are reduced in thickness. The dielectric ceramic contains, as its main constituent, a compound represented by the general formula $(Ba_{1-x-y}Ca_xRe_y)(Ti_{1-z}M_z)O_3$ (where Re is at least one or more elements selected from among La, Ce, Pr, Nd, Sm, Eu, Gd, Tb, Dy, Ho, Er, Tm, Yb, Lu, and Y, and M is at least one or more elements selected from among Mg, Mn, Al, Cr, and Zn), $0 \leq x \leq 0.2$, $0.002 \leq y \leq 0.1$, and $0.001 \leq z \leq 0.05$. This dielectric ceramic has crystal grains of 20 nm or more and 150 nm or less in average grain size.

20 Claims, 1 Drawing Sheet

(51) Int. Cl.

| | |
|---|---|
| C04B 35/46 | (2006.01) |
| C04B 35/468 | (2006.01) |
| H01B 3/12 | (2006.01) |
| H01G 4/12 | (2006.01) |
| H01G 4/30 | (2006.01) |
| B32B 18/00 | (2006.01) |
| C01G 23/00 | (2006.01) |
| C04B 35/626 | (2006.01) |
| C04B 35/638 | (2006.01) |
| C01G 37/14 | (2006.01) |
| C01G 45/12 | (2006.01) |
| B82Y 30/00 | (2011.01) |

(52) U.S. Cl.
CPC .............. *B32B18/00* (2013.01); *C01G 23/003* (2013.01); *C04B 35/6261* (2013.01); *C04B 35/62675* (2013.01); *C04B 35/638* (2013.01); C04B 2235/3208 (2013.01); C04B 2235/3217 (2013.01); C04B 2235/3225 (2013.01); C04B 2235/3227 (2013.01); *C04B 2235/3229* (2013.01); C04B 2235/3241 (2013.01); C04B 2235/3284 (2013.01); C04B 2235/3418 (2013.01); C04B 2235/44 (2013.01); C04B 2235/5454 (2013.01); C04B 2235/6584 (2013.01); C04B 2235/72 (2013.01); C04B 2235/781 (2013.01); C04B 2235/785 (2013.01); C04B 2237/346 (2013.01); C04B 2237/704 (2013.01); *C01G 37/14* (2013.01); *C01G 45/1264* (2013.01); C01P 2004/62 (2013.01); C01P 2004/64 (2013.01); *B82Y 30/00* (2013.01)

(56) References Cited

FOREIGN PATENT DOCUMENTS

| JP | 2008297133 A | 12/2008 |
|---|---|---|
| WO | WO-2008013236 A1 | 1/2008 |

* cited by examiner

DIELECTRIC CERAMIC, LAMINATED CERAMIC CAPACITOR, METHOD FOR PRODUCING THE DIELECTRIC CERAMIC, AND METHOD FOR MANUFACTURING THE MULTILAYER CERAMIC CAPACITOR

This is a continuation of application Ser. No. PCT/JP2011/068942, filed Aug. 23, 2011, the entire contents of which are incorporated herein by reference.

TECHNICAL FIELD

The present invention relates to a dielectric ceramic and a method for producing the dielectric ceramic. In addition, the present invention relates to a laminated ceramic capacitor configured with the use of the dielectric ceramic, and a method for manufacturing the laminated ceramic capacitor.

BACKGROUND ART

With the progress in recent electronics technology, a reduction in size and increase in capacitance have been required for laminated ceramic capacitors. In order to satisfy these requirements, a reduction in dielectric layer thickness has advanced in the layers of laminated ceramic capacitors. However, the reduction of the dielectric layers in layer thickness causes an increase in the electric field intensity applied per layer. Therefore, improvements in reliability in the case of applying a voltage, and in particular, improvements in the lifetime characteristic in a high-temperature loading test is required for the dielectric ceramic used in the dielectric layers.

For example, Patent Document 1 discloses a dielectric ceramic which is characterized in that the dielectric ceramic has a perovskite-type crystal structure containing barium titanate as its main constituent and containing a rare-earth element, magnesium, and manganese as accessory constituents, and is represented by the composition formula $(Ba_{1-y}RE_y)(Ti_{1-a-b}M_{ao}Mn_b)O_3$ (RE: rare-earth element), with respective ranges expressed by $0.06 \leq y \leq 0.09$, $0.03 \leq ao \leq 0.045$, and $0.012 \leq b \leq 0.018$.

PRIOR ART DOCUMENT

Patent Document

Patent Document 1: JP 2007-145649 A

DISCLOSURE OF THE INVENTION

Problem to be solved by the invention

Patent Document 1 fails to disclose any case of reduction of dielectric layers in thickness. Therefore, it is not known whether or not the dielectric ceramic described in Patent Document 1 has high reliability in the case of applying a voltage when dielectric layers are reduced in thickness down to on the order of 1 μm.

The present invention has been achieved in view of the problem, and an object of the present invention is to provide a laminated ceramic capacitor which has a favorable dielectric property and produces excellent lifetime characteristics in a high-temperature loading test, even when a voltage with a high electric field intensity is applied to dielectric layers further reduced in thickness.

Means for Solving the Problem

A dielectric ceramic according to the present invention contains, as its main constituent, a compound represented by the general formula $(Ba_{1-x-y}Ca_xRe_y)(Ti_{1-z}M_z)O_3$ (where Re is at least one or more elements selected from among La, Ce, Pr, Nd, Sm, Eu, Gd, Tb, Dy, Ho, Er, Tm, Yb, Lu, and Y, and M is at least one or more elements selected from among Mg, Mn, Al, Cr, and Zn) in the range of $0 \leq x \leq 0.2$, $0.002 \leq y \leq 0.1$, and $0.001 \leq z \leq 0.05$, and has crystal grains of 20 nm or more and 150 nm or less in average grain size.

In addition, the dielectric ceramic according to the present invention preferably has an average grain size of 20 nm or more and less than 100 nm.

In addition, the present invention is directed to a laminated ceramic capacitor which includes: a laminated body including a plurality of stacked dielectric layers and a plurality of internal electrodes formed along interface between dielectric layers; and a plurality of external electrodes formed on the outer surface of the laminated body and electrically connected to the internal electrodes, and the laminated ceramic capacitor is characterized in that the dielectric layers are composed of the dielectric ceramic.

Further, the present invention is also directed to a method for producing a dielectric ceramic, which includes the steps of: preparing a ceramic powder containing, as its main constituent, a compound represented by the general formula $(Ba_{1-x-y}Ca_xRe_y)(Ti_{1-z}M_z)O_3$ (where Re is at least one or more elements selected from among La, Ce, Pr, Nd, Sm, Eu, Gd, Tb, Dy, Ho, Er, Tm, Yb, Lu, and Y, and M is at least one or more elements selected from among Mg, Mn, Al, Cr, and Zn) in the range of $0 \leq x \leq 0.2$, $0.002 \leq y \leq 0.1$, and $0.001 \leq z \leq 0.05$; forming the ceramic powder into a compact; and firing the compact to obtain a dielectric ceramic including crystal grains of 20 nm or more and 150 nm or less in average grain size.

In the method for producing a dielectric ceramic according to the present invention, the average grain size is preferably 20 nm or more and less than 100 nm.

In addition, the present invention is also directed to a method for manufacturing a laminated ceramic capacitor, which is characterized by including the method for producing a dielectric ceramic.

Advantageous Effect of the Invention

The dielectric ceramic according to this invention has the composition as described above, as well as crystal grains defined in terms of grain size as described above, thereby making it possible to provide a laminated ceramic capacitor which has a favorable dielectric property and produces excellent lifetime characteristics in a high-temperature loading test, even when a voltage with a high electric field intensity is applied to dielectric layers further reduced in thickness.

DESCRIPTION OF THE INVENTION

Figure 1:
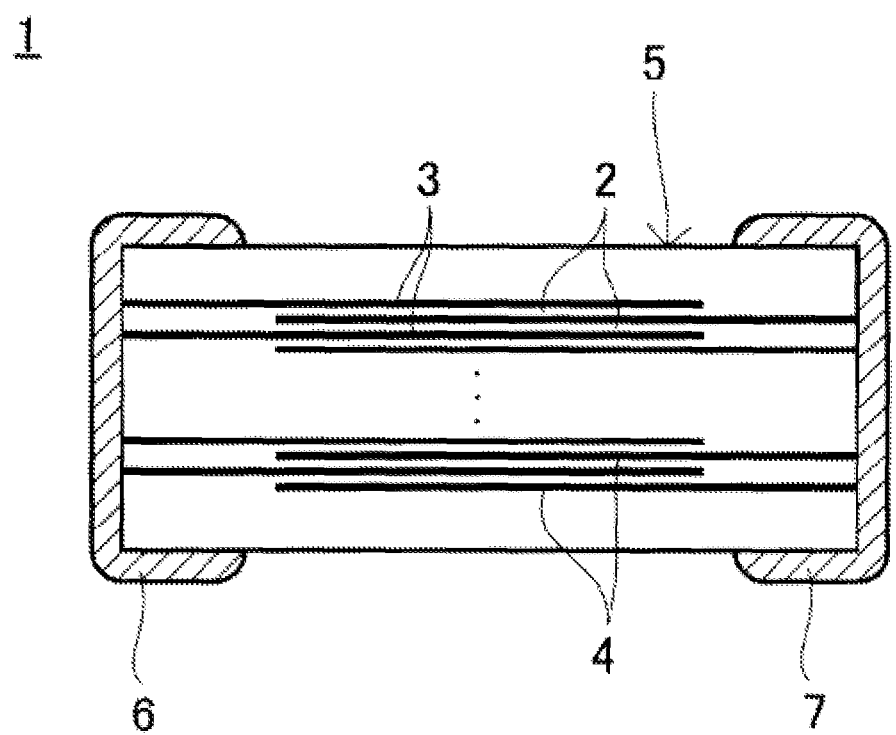
FIG. 1 is a cross-sectional view of a laminated ceramic capacitor according to the present invention.

An embodiment for carrying out the present invention will be described below.

FIG. 1 is a cross-sectional view of a laminated ceramic capacitor according to the present invention.

The laminated ceramic capacitor 1 includes a laminated body 5. The laminated body 5 includes a plurality of stacked dielectric layers 2, and a plurality of internal electrodes 3 and 4 formed along interfaces between dielectric layers 2. Materials for the internal electrodes 3 and 4 include, for example, a material containing Ni as its main constituent.

External electrodes 6 and 7 are formed in different positions on the outer surface of the laminated body 5. Materials for the external electrodes 6 and 7 include, for example, a material containing Ag or Cu as its main constituent. In the laminated ceramic capacitor embodiment shown in FIG. 1, the external electrodes 6 and 7 are formed on respective end surfaces of the laminated body 5, which are opposed to each other. The internal electrodes 3 and 4 are electrically connected respectively to the external electrodes 6 and 7. Furthermore, the internal electrodes 3 and 4 are stacked alternately with the dielectric layers 2 interposed therebetween in the laminated body 5.

It is to be noted that the laminated ceramic capacitor 1 may be a two-terminal capacitor including two external electrodes 6 and 7, or may be a multi-terminal capacitor including a larger number of external electrodes.

The dielectric layers 2 are composed of a dielectric ceramic containing, as its main constituent, a compound represented by the general formula $(Ba_{1-x-y}Ca_xRe_y)(Ti_{1-z}M_z)O_3$ (where Re is at least one or more elements selected from among La, Ce, Pr, Nd, Sm, Eu, Gd, Tb, Dy, Ho, Er, Tm, Yb, Lu, and Y, and M is at least one or more elements selected from among Mg, Mn, Al, Cr, and Zn) and where $0 \leq x \leq 0.2$, $0.002 \leq y \leq 0.1$, and $0.001 \leq z \leq 0.05$. Furthermore, the dielectric ceramic is adapted to have crystal grains of 20 nm or more and 150 nm or less in average grain size.

When the average grain size is 20 nm or more and less than 100 nm, it is possible to provide a laminated ceramic capacitor which produces further excellent lifetime characteristics in a high-temperature loading test.

It is to be noted that the molar ratio between (Ba, Ca, Re) and (Ti, M) is set appropriately, and preferably selected in the range of 0.98 to 1.05.

The ceramic powder is prepared, for example, by a solid-phase synthesis method. Specifically, first, compound powders such as oxides, carbonates, chlorides, and metal organic compounds, each including Ba, Ca, Re, Ti, or M as a constituent element for the main constituent, are mixed in predetermined proportions, and subjected to calcination. It is to be noted that a hydrothermal synthesis method, a hydrolysis method, etc. may be applied in addition to the solid-phase synthesis method.

The laminated ceramic capacitor is, for example, manufactured as follows. The ceramic powder obtained in the way described above is used to prepare ceramic slurry. Then, ceramic green sheets are formed by a sheet forming method or the like. A plurality of stacked ceramic green sheets is subjected to pressure bonding to obtain a compact, and the compact is subjected to firing. In this firing step, the ceramic powder provides dielectric layers composed of the dielectric ceramic. Thereafter, external electrodes are formed by baking or the like on end surfaces of the laminated body.

Next, experimental examples will be described which were carried out according to the present invention.

Experimental Example 1

(A) Preparation of Ceramic Powder

Respective powders of particulate $BaCO_3$, $CaCO_3$, $TiO_2$, Re (Re is La, Ce, Pr, Nd, Sm, Eu, Gd, Tb, Dy, Ho, Er, Tm, Yb, Lu and Y), and M (M is Mg, Mn, Al, Cr and Zn) were prepared as starting raw materials. Respective powders of $La_2O_3$, $Ce_2O_3$, $Pr_2O_3$, $Nd_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$, $Yb_2O_3$, $Lu_2O_3$, and $Y_2O_3$ were prepared as the Re powder. In addition, respective powders of $MgCO_3$, $MnCO_3$, $Al_2O_3$, $Cr_2O_3$, and ZnO were prepared as the M powder. Then, these powders were weighed for the composition of $(Ba_{1-x-y}Ca_xRe_y)(Ti_{1-z}M_z)O_3$ in Table 1, and then mixed for 80 hours in a ball mill. Thereafter, the mixed powders were subjected to a heat treatment at 1000° C. for calcination synthesis, thereby providing a main constituent powder of the formula $(Ba_{1-x-y}Ca_xRe_y)(Ti_{1-z}M_z)O_3$. Thereafter, 1.5 parts by mol of $BaCO_3$ and 2 parts by mol of $SiO_2$ were added to 100 parts by mol of the main constituent powder to obtain a ceramic powder.

The obtained ceramic powder had an average grain size on the order of 10 nm. In addition, XRD indicated that unreacted materials in the ceramic powder were below the detection level. More specifically, it has been confirmed that this ceramic powder is a highly synthesized powder, in spite of being extremely fine grains.

TABLE 1

| Sample Number | Re | M | Ca Content x | Re Content x | M Content z | Molar Ratio (Ba, Ca, Re)/(Ti, M) |
|---|---|---|---|---|---|---|
| 1 | Gd | Mn | 0 | 0.05 | 0.025 | 0.995 |
| 2 | La | Mg | 0.197 | 0.04 | 0.02 | 0.996 |
| 3 | Ce | Al | 0.05 | 0.002 | 0.002 | 1.006 |
| 4 | Pr | Cr | 0.05 | 0.1 | 0.045 | 0.993 |
| 5 | Nd | Zn | 0.05 | 0.005 | 0.001 | 1.000 |
| 6 | Dy | Mg | 0.05 | 0.07 | 0.05 | 0.986 |
| 7 | Sm | Mg | 0.05 | 0.06 | 0.03 | 1.005 |
| 8 | Er | Mg | 0.1 | 0.04 | 0.02 | 1.002 |
| 9 | Lu | Mn | 0.1 | 0.09 | 0.045 | 1.004 |
| 10 | Ho | Al | 0 | 0.08 | 0.04 | 0.995 |
| 11 | Eu | Zn | 0.1 | 0.05 | 0.025 | 1.005 |
| 12 | Gd | Mg | 0.06 | 0.04 | 0.02 | 0.999 |
| 13 | Tm | Mg | 0.075 | 0.03 | 0.015 | 1.006 |
| 14 | Tb | Mn | 0 | 0.03 | 0.015 | 1.001 |
| 15 | Y | Mg | 0.05 | 0.06 | 0.03 | 1.004 |
| 16 | Dy | Mn | 0.05 | 0.08 | 0.04 | 0.987 |
| 17 | Yb | Mg | 0.05 | 0.06 | 0.03 | 0.991 |
| 18 | Yb | Al | 0.05 | 0.04 | 0.02 | 1.002 |
| 19 | Tm | Mn | 0.05 | 0.03 | 0.015 | 1.001 |
| 20 | Eu | Al | 0.21 | 0.04 | 0.02 | 1.009 |
| 21 | Pr | Mn | 0.05 | 0.001 | 0.005 | 1.000 |
| 22 | Ho | Zn | 0.05 | 0.115 | 0.045 | 1.005 |
| 23 | Er | Al | 0.05 | 0.005 | 0.0005 | 0.994 |
| 24 | Y | Mg | 0.05 | 0.091 | 0.072 | 1.001 |

(B) Preparation of Laminated Ceramic Capacitor

First, ceramic green sheets to serve as dielectric layers were formed. Specifically, the ceramic powder described above, a polyvinyl butyral based binder and ethanol combination was subjected to wet mixing for 24 hours in a ball mill. Thereafter, filtering was carried out with the use of a filter to prepare slurry by eliminating the powder of the grain sizes other than grain sizes in a predetermined range. Then, this slurry was formed into sheets by a RIP method to obtain ceramic green sheets. The ceramic green sheets were adapted to have the thickness after firing shown in "Dielectric Layer Thickness" in Table 2 as will be described later.

Next, a compact was prepared. Specifically, a conductive paste containing Ni as its main constituent was applied by screen printing onto specific ceramic green sheets to form conductive paste films to serve as internal electrodes. Then, the plurality of ceramic green sheets with the conductive paste films formed thereon was stacked so as to alternate the sides to which the conductive paste films were extracted, and then subjected to pressure bonding to obtain the compact.

Next, the compact was subjected to firing. Specifically, first, the binder was burned by heating to a temperature of 300° C. in a reducing atmosphere. Thereafter, firing was carried out at a temperature of 1200° C. for 1 hour in a reducing atmosphere composed of a $H_2$—$N_2$—$H_2O$ gas with an oxygen partial pressure of $10^{-10}$ MPa.

Next, external electrodes were formed. Specifically, a Cu paste containing a $B_2O_3$—$Li_2O$–$SiO_2$—BaO based glass frit was applied onto both end surfaces of the laminated body. Thereafter, the Cu paste was baked by heating at a temperature of 800° C. in a nitrogen atmosphere. In this way, external electrodes were formed which were electrically connected to the internal electrodes.

The laminated ceramic capacitor was prepared in the way described above. The laminated ceramic capacitor had external dimensions of length: 1.0 mm, width: 0.5 mm, and thickness: 0.5 mm, the number of effective dielectric layers was 100, and the area of the internal electrode opposed per dielectric layer was 0.3 mm². In addition, the dielectric layer interposed between the internal electrodes had a thickness as shown in the "Dielectric Layer Thickness" of Table 2.

(C) Characterization

The laminated ceramic capacitors obtained were evaluated for various types of characteristics.
Average Grain Size The average grain size was calculated as follows. First, the laminated ceramic capacitors for each sample were fractured, and subjected to thermal etching at a temperature of 1000° C., and the fractured surfaces were observed with the use of a scanning microscope. Then, the observed images were subjected to an image analysis to measure the grain sizes of the crystal grains with the equivalent circle diameters of the crystal grains as the grain sizes. Then, for each sample, the grain sizes of three-hundred crystal grains were measured to calculate the average value as an average grain size.
High-Temperature Loading Life Test The high-temperature loading life test was carried out as follows. DC voltages were applied to the laminated ceramic capacitors according to each sample to produce each electric field intensity of 6.3 kV/mm and 12.6 kV/mm at a temperature of 125° C. Then, the high-temperature loading life test was carried out for one hundred samples to determine, as defectives, the samples having an insulation resistance value of 100 kΩ or less before a lapse of 1000 hours, and to find the number of defectives among the hundred samples.

Table 2 shows the average grain size, the dielectric layer thickness, and the number of defectives after the high-temperature loading life test.

TABLE 2

| Sample Number | Average Grain Size [μm] | Dielectric Layer Thickness [μm] | Number of Defectives in High-Temperature Loading Life Test | |
|---|---|---|---|---|
| | | | 6.3 V/μm | 12.6 V/μm |
| 1 | 85 | 0.87 | 0/100 | 0/100 |
| 2 | 78 | 0.78 | 0/100 | 0/100 |
| 3 | 55 | 0.56 | 0/100 | 0/100 |
| 4 | 132 | 0.98 | 0/100 | 3/100 |
| 5 | 24 | 0.48 | 0/100 | 0/100 |
| 6 | 128 | 1.05 | 0/100 | 3/100 |
| 7 | 64 | 0.42 | 0/100 | 0/100 |
| 8 | 57 | 0.32 | 0/100 | 0/100 |
| 9 | 141 | 1.02 | 0/100 | 4/100 |
| 10 | 35 | 0.61 | 0/100 | 0/100 |
| 11 | 81 | 0.72 | 0/100 | 0/100 |
| 12 | 48 | 0.35 | 0/100 | 0/100 |
| 13 | 31 | 0.82 | 0/100 | 0/100 |
| 14 | 98 | 1.01 | 0/100 | 0/100 |
| 15 | 108 | 1.23 | 0/100 | 3/100 |
| 16 | 28 | 0.55 | 0/100 | 0/100 |
| 17 | 148 | 1.30 | 0/100 | 6/100 |
| *18 | 18 | 0.34 | 72/100 | 87/100 |
| *19 | 167 | 0.82 | 100/100 | 100/100 |
| *20 | 110 | 0.81 | 68/100 | 84/100 |
| *21 | 145 | 0.75 | 100/100 | 100/100 |
| *22 | 48 | 0.85 | 75/100 | 88/100 |
| *23 | 98 | 0.65 | 97/100 | 100/100 |
| *24 | 69 | 1.02 | 68/100 | 81/100 |

It is to be noted that the sample numbers marked with * in Tables 1 and 2 refer to samples which fall outside the scope of the present invention.

(D) Consideration

Sample numbers 1, 10, and 14 containing a dielectric (Ba, Re) (Ti, M)$O_3$ as their main constituent exhibited favorable reliability at the DC voltages of both 6.3 kV/μm and 12.6 kV/μm. In addition, sample numbers 2 to 9, 11 to 13, and 15 to 17 containing (Ba, Ca, Re) (Ti, M)$O_3$ as their main constituent exhibited favorable reliability at the DC voltages of both 6.3 kV/μm and 12.6 kV/μm. Further, sample numbers 1 to 3, 5, 7, 8, 10 to 14, having 16 of 20 nm or more and less than 100 nm in average grain size exhibited favorable reliability without causing any defectives even under the test condition at the DC voltage of 12.6 kV/μm.

In contrast to these samples, sample number 18 having less than 20 nm in average grain size yielded a result of low reliability. In addition, sample number 19 having more than 150 nm in average grain size yielded a result of low reliability. This is considered to be because the large average grain size caused the electric field to be concentrated locally in the laminated body in the case of sample number 19.

Sample number 20 also yielded a result of low reliability. This is considered to be because the Ca content x more than 0.02 made densification less likely to degrade the mechanical strength.

Sample number 21 with the Re content y less than 0.002 yielded a result of low reliability. In addition, sample number 22 also yielded a result of low reliability. This is considered to be because the Re content y more than 0.1 caused segregation after the firing.

Sample number 23 with the M content z less than 0.001 yielded a result of low reliability. In addition, sample number 24 also yielded a result of low reliability. This is considered to be because the M content z more than 0.05 caused segregation after the firing.

Experimental Example 2

The influence of impurities was evaluated in Experimental Example 2. There is a possibility that Sr, Zr, Hf, Zn, Na, Ag, Pd, Ni, and the like will be present as impurities in a raw material preparation step, etc. for the laminated ceramic capacitor. These have the possibility of being present in the crystal grains and at crystal grain boundaries between crystal grains. In addition, there is a possibility that an internal electrode constituent will be diffused into crystal grain boundaries in the dielectric ceramic and crystal grain boundaries between crystal grains in a firing step, etc. for the laminated ceramic capacitor. Experimental Example 2 is intended to evaluate the influence of these impurities.

(A) Preparation of Ceramic Powder

Ceramic powders were prepared in the same way as in Experimental Example 1, except that the impurity components shown in Table 3 were added to the composition of sample number 13 in Experimental Example 1.

TABLE 3

| Sample Number | Details of Impurity Components |
|---|---|
| 31 | 0.4Hf, 0.02Zn |
| 32 | 0.25Sr, 0.1Na |
| 33 | 0.5Zr, 0.02Ag, 0.01Ni |
| 34 | 0.05Ni, 0.1Na |
| 35 | 0.2Na, 0.02Hf |
| 36 | 0.4Pd, 3.2Ni |
| 37 | 1.1Ag, 1.0Zr |
| 38 | 0.1Pd, 0.05Sr |
| 39 | 0.003Ag, 0.05Pd |
| 40 | 1.3Ni |

(B) Preparation of Laminated Ceramic Capacitor

The ceramic powders were used to prepare laminated ceramic capacitors in the same way as in Experimental Example 1.

(C) Characterization

The laminated ceramic capacitors obtained were evaluated for various types of characteristics in the same way as in Experimental Example 1. Table 4 shows the results of a high-temperature loading life test.

TABLE 4

| Sample Number | Number of Defectives in High-Temperature Loading Life Test | |
|---|---|---|
| | 6.3 V/μm | 12.6 V/μm |
| 31 | 0/100 | 0/100 |
| 32 | 0/100 | 0/100 |
| 33 | 0/100 | 0/100 |
| 34 | 0/100 | 0/100 |
| 35 | 0/100 | 0/100 |
| 36 | 0/100 | 0/100 |
| 37 | 0/100 | 0/100 |
| 38 | 0/100 | 0/100 |
| 39 | 0/100 | 0/100 |
| 40 | 0/100 | 0/100 |

(D) Consideration

As can be seen from Table 4, each of samples 31 to 40 with the impurities contained therein exhibits high reliability, which results from that fact that the number of defectives in the high-temperature loading life test is 0 at the electric field intensities of both 6.3 kV/mm and 12.6 kV/mm. In addition, the average grain size was 20 nm or more and 150 nm or less in each case of samples 31 to 40.

DESCRIPTION OF REFERENCE SYMBOLS

1 laminated ceramic capacitor
2 dielectric layer
3, 4 internal electrode
5 laminated body
6, 7 external electrode

The invention claimed is:

1. A dielectric ceramic comprising, as its main constituent, a compound represented by the general formula $(Ba_{1-x-y}Ca_xRe_y)(Ti_{1-z}M_z)O_3$ in which Re is at least one element selected from the group consisting of La, Ce, Pr, Nd, Sm, Eu, Gd, Tb, Dy, Ho, Er, Tm, Yb, Lu, and Y, and M is at least one element selected from the group consisting of Mg, Mn, Al, Cr, and Zn, $0 \leq x \leq 0.2$, $0.002 \leq y \leq 0.1$, and $0.001 \leq z \leq 0.05$, and having crystal grains of 20 nm or more and 150 nm or less in average grain size.

2. The dielectric ceramic according to claim 1, wherein the average grain size is 20 nm or more and less than 100 nm.

3. The dielectric ceramic according to claim 2, wherein $0.004 \leq y$, and $0.0015 \leq z \leq 0.04$.

4. The dielectric ceramic according to claim 3, wherein x is 0.

5. The dielectric ceramic according to claim 3, wherein x is greater than 0.

6. A laminated ceramic capacitor comprising:
a laminated body including a plurality of stacked dielectric layers and a plurality of internal electrodes disposed at interfaces between dielectric layers; and
a plurality of external electrodes on an outer surface of the laminated body and electrically connected to the internal electrodes,
wherein the dielectric layers are composed of the dielectric ceramic according to claim 3.

7. A laminated ceramic capacitor comprising:
a laminated body including a plurality of stacked dielectric layers and a plurality of internal electrodes disposed at interfaces between dielectric layers; and
a plurality of external electrodes on an outer surface of the laminated body and electrically connected to the internal electrodes,
wherein the dielectric layers are composed of the dielectric ceramic according to claim 2.

8. A laminated ceramic capacitor comprising: a laminated body including a plurality of stacked dielectric layers and a plurality of internal electrodes disposed at interfaces between dielectric layers; and a plurality of external electrodes on an outer surface of the laminated body and electrically connected to the internal electrodes,
wherein the dielectric layers are composed of the dielectric ceramic according to claim 1.

9. A method for producing a dielectric ceramic, the method comprising:
providing a compact containing a ceramic powder containing, as its main constituent, a compound represented by the general formula $(Ba_{1-x-y}Ca_xRe_y)(Ti_{1-z}M_z)O_3$ in which Re is at least one element selected from the group consisting of La, Ce, Pr, Nd, Sm, Eu, Gd, Tb, Dy, Ho, Er, Tm, Yb, Lu, and Y, and M is at least one element selected from the group consisting of Mg, Mn, Al, Cr, and Zn, $0 \leq x \leq 0.2$, $0.002 \leq y \leq 0.1$, and $0.001 \leq z \leq 0.05$; and
firing the compact to obtain a dielectric ceramic including crystal grains of 20 nm or more and 150 nm or less in average grain size.

10. The method for producing a dielectric ceramic according to claim 9, wherein the average grain size is 20 nm or more and less than 100 nm.

11. The method for producing a dielectric ceramic according to claim 10, wherein $0.004 \leq y$, and $0.0015 \leq z \leq 0.04$.

12. The method for producing a dielectric ceramic according to claim 11, wherein x is 0.

13. The method for producing a dielectric ceramic according to claim 11, wherein x is greater than 0.

14. The method for producing a dielectric ceramic according to claim 9, further comprising forming the compact.

15. The method for producing a dielectric ceramic according to claim 14, further comprising forming the ceramic powder.

16. A method for manufacturing a laminated ceramic capacitor, wherein the method comprises the method for producing a dielectric ceramic according to claim 3.

17. A method for manufacturing a laminated ceramic capacitor, wherein the method comprises the method for producing a dielectric ceramic according to claim 2.

18. A method for manufacturing a laminated ceramic capacitor, wherein the method comprises the method for producing a dielectric ceramic according to claim 1.

19. A method for manufacturing a laminated ceramic capacitor, wherein the method comprises the method for producing a dielectric ceramic according to claim 9.

20. A method for manufacturing a laminated ceramic capacitor, wherein the method comprises the method for producing a dielectric ceramic according to claim 10.

* * * * *